United States Patent Office 2,848,454
Patented Aug. 19, 1958

2,848,454
MERCAPTO DERIVATIVES OF MERCURATED 1-PYRIDYL-3-ALLYLUREAS

John H. Biel, Milwaukee, Wis., assignor to Lakeside Laboratories, Inc., a corporation of Wisconsin No Drawing. Application June 4, 1956
Serial No. 588,998

10 Claims. (Cl. 260—270)

This invention relates to novel chemical compounds and processes of preparing the same. More particularly, this invention relates to novel sulfur containing mercury compounds.

By this invention there are provided novel mercapto derivatives of mercuration products of 1-pyridyl-3-allylureas, which compounds have the formula

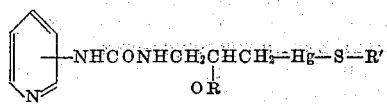

wherein R is hydrogen or a lower alkyl group, R' is a residue from a lower monocarboxylic acid, lower polycarboxylic acid, particularly dicarboxylic acids, aromatic mono and polycarboxylic acids, particularly where the aryl moiety is phenyl, lower alcohols, lower polyhydric alcohols, and salts thereof.

Examples of particular residues which R'—S— of the above formula may represent are the following groups from mercapto acids and mercapto alcohols:

$HO_2C$—$CH_2$—S—
Carboxymethylmercapto

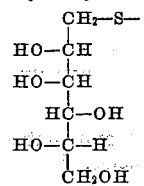
1-thiosorbityl $CH_3CH_2CH$—S—
|
$CO_2H$
1-carboxypropylmercapto

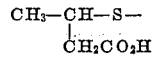
1-carboxymethyl-ethylmercapto

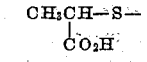
1-carboxyethylmercapto

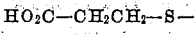
2-carboxyethylmercapto

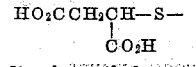
1,2-dicarboxyethylmercapto

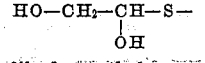
1,2-dihydroxyethylmercapto

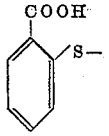
2-mercaptobenzoic acid

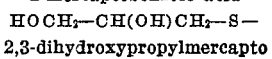
2,3-dihydroxypropylmercapto

The starting materials for producing these mercapto derivatives are 1-pyridyl-3-(β-hydroxy or lower alkoxy-γ-hydroxymercuri propyl)-ureas, 1-pyridyl-3-β-hydroxy or lower alkoxy-γ-halomercuri propyl)-ureas and 1-pyridyl-3-(β-hydroxy or lower alkoxy-γ-acyloxymercuri propyl)-ureas. The urea moiety of the compounds may be joined at the α, β or γ position of the pyridyl group. Such compounds are disclosed in my copending application, Serial No. 588,999 filed June 4, 1956. In that application it is disclosed that by reacting an aminopyridine with allylisocyanate a 1-pyridyl-3-allylurea is formed which, upon reaction with a lower acyloxy mercury salt in water or a lower alcohol gives the corresponding 1-pyridyl-3-(β-hydroxy or lower alkoxy-γ-acyloxymercuri propyl)-urea. By treatment of the acyloxymercuri derivative with an alkali halide or alkali hydroxide the corresponding hydroxymercuri and halomercuri compounds are formed. Representative of the starting materials which may be used in the subject invention are 1-(α-pyridyl)-3-(β-hydroxy-γ-hydroxymercuri propyl) - urea, 1-(β-pyridyl) - 3-(β-methoxy-γ-acetoxymercuri propyl)-urea, 1 - (γ - pyridyl) - 3 - (β-hydroxy-γ-chloromercuri propyl)-urea and similar compounds in which the lower acyloxy groups are acetoxy, propionyloxy, butyryloxy and valeryloxy and the lower alkoxy groups are methoxy, ethoxy, propionoxy, butoxy and amyloxy.

The compounds of this invention are conveniently produced by contacting a starting material such as described above with a mercapto acid or a mercapto alcohol in a suitable solvent medium.

Dilute aqueous sodium hydroxide may be used as the reaction medium for the mercapto acids. The reaction proceeds quickly at room temperature and is often completed in a matter of minutes. Higher temperatures, such as up to the reflux temperature, may be employed, however to enhance reaction of the slowly-reactive mercapto acids. Following termination of the reaction, the mixture is usually filtered. The basic reaction mixture gives salts of the reaction product. Upon neutralization of the mixture the free acid is formed and precipitates. It is conveniently recovered and purified by conventional procedures.

Although the mercapto alcohols may also be reacted in aqueous sodium hydroxide with the mercuri starting compound, it is often better to employ an organic solvent such as a lower alcohol, or other suitable solvent, in the absence of the base. From room to reflux temperatures may be employed according to the reactivity of particular reactants. The desired product may precipitate from the reaction mixture and can, therefore, be recovered by filtration; otherwise, it may be recovered by evaporating the mixture to dryness or other common procedures.

Approximately equimolar ratios of reactants are preferred although other ratios may also be used.

The compounds of this invention form salts. Those compounds having carboxy groups form alkali metal salts, such as sodium and potassium salts, readily upon contacting the acid and a suitable base in water. Ammonium salts are similarly prepared by the use of ammonium hydroxide. Salts are also formed with amines such as procaine, choline and the like.

The novel compounds provided by this invention are potent diuretic agents which are effective by all routes of administration and are, therefore, valuable agents for the treatment of congestive heart failure. It is surprising that these compounds are administrable by all routes as generally such compounds must be administered according to a particular route. These compounds may be given orally and parenterally, the latter either intramuscularly or subcutaneously. Dosage unit forms such as tablets, capsules and solutions may be formulated for the intended route of administration.

The following examples are presented to illustrate methods of producing certain of the novel compounds included within this invention. It is understood, however, that these examples are included only for purposes of illustration, and that the invention is not to be restricted to the embodiments specifically disclosed therein.

EXAMPLE 1

*1 - (β - pyridyl) - 3 - [γ - (1-carboxyethylmercapto)-mercuri-β-methoxypropyl]-urea*

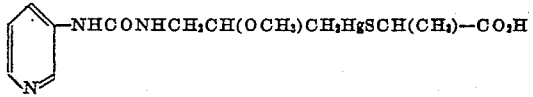

To 4.7 g. (0.010 mole) of 1-(β-pyridyl)-3-(β-methoxy-γ-acetoxymercuri propyl)-urea dissolved in 25 cc. of warm methanol was added 1.1 g. (0.010 mole) of thiolacetic acid. On seeding, a white crystalline precipitate was obtained; yield 3.9 g.; M. P. 121° C. sharp decomposition.

*Analysis.*—Calcd. for $C_{13}H_{19}HgN_3O_4S$: Hg, 39.1; N, 8.19; S, 6.23. Found: Hg, 38.5; N, 8.02; S, 6.08.

EXAMPLE 2

*1 - (β - pyridyl)-3-[γ-(1,2-dicarboxyethylmercapto)-mercuri-β-methoxypropyl]-urea*

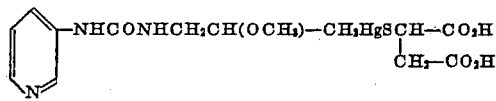

To 4.7 g. (0.010 mole) of 1-(β-pyridyl)-3-(β-methoxy-γ-acetoxymercuri propyl)-urea dissolved in 25 cc. of methanol was added 1.5 g. (0.010 mole) of thiomalic acid dissolved in methanol. A white, gummy precipitate resulted which was crystallized from acetone, yield 2.4 g., M. P. 80° C. dec.

*Analysis.*—Calcd. for $C_{14}H_{19}HgN_3O_6S$: Hg, 34.7; N, 7.54; S, 5.73. Found: Hg, 35.9; N, 7.36; S, 4.91.

EXAMPLE 3

*1 - (β-pyridyl)-3-[γ-(1-thiosorbityl)-mercuri-β-methoxypropyl]-urea*

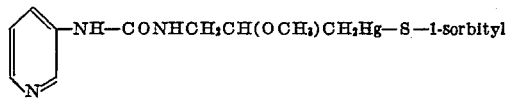

To 4.7 g. (0.010 mole) of 1-(β-pyridyl)-3-(β-methoxy-γ-acetoxymercuri propyl)-urea dissolved in 25 cc. of methanol was added 1.98 g. (0.010 mole) of 1-thiosorbitol. After several days a crystalline precipitate appeared which was separated by filtration, M. P. 122° C. dec.

EXAMPLE 4

*1 - (β - pyridyl) - 3 - [γ - (carboxymethylmercapto)-mercuri-β-methoxypropyl]-urea*

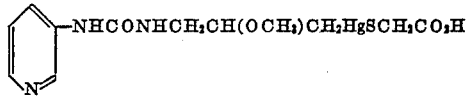

Prepared as described in Example 1, from carboxymethyl mercapto, M. P. 125–126° C. dec.

*Analysis.*—Calcd. for $C_{12}H_{17}HgN_3O_4S$: Hg, 40.2; N, 8.02; S, 6.08. Found: Hg, 38.8; N, 8.08; S, 6.53.

Various changes and modifications of the invention can be made and, to the extent that such variations incorporate the spirit of this invention, they are intended to be included within the scope of the appended claims.

What is claimed is:

1. A member of the group of compounds of the formula

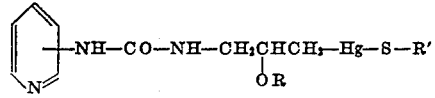

wherein R is a member of the group consisting of hydrogen and lower alkyl groups, and R' is a member of the group consisting of monocarboxy substituted lower alkyl groups, polycarboxy substituted lower alkyl groups, monocarboxy substituted phenyl groups, polycarboxy substituted phenyl groups, lower hydroxy alkyl groups and lower polyhydric alcohol groups, and nontoxic salts of such compounds.

2. 1 - pyridyl-3-[γ-(1-carboxy-lower alkyl-mercapto)-mercuri-β-lower alkoxy propyl]-urea.

3. 1 - (β - pyridyl) - 3 - [γ - (1 - carboxyethylmercapto)-mercuri-β-methoxypropyl]-urea.

4. 1 - pyridyl-3-[γ-(dicarboxy-lower alkyl-mercapto)-mercuri-β-lower alkoxy propyl]-urea.

5. 1 - (β - pyridyl) - 3 - [γ - (1,2-dicarboxyethyl-mercapto)-mercuri-β-methoxypropyl]-urea.

6. 1 - pyridyl - 3-[γ-(1-thiosorbityl)-mercuri-β-lower alkoxy-propyl]-urea.

7. 1 - (β - pyridyl) - 3 - [γ- thiosorbityl)-mercuri-β-methoxy-propyl]-urea.

8. 1 - pyridyl - 3-[γ-(carboxy-lower alkyl-mercapto)-mercuri-β-lower alkoxy propyl]-urea.

9. 1 - (β - pyridyl) - 3 - [γ-(carboxymethylmercapto)-mercuri-β-methoxypropyl]-urea.

10. The process which comprises reacting a compound of the formula

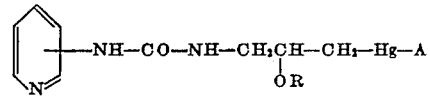

with a member of the group consisting of lower mercaptan monocarboxylic acids, lower mercaptan polycarboxylic acids, phenyl mercaptan monocarboxylic acids, phenyl mercaptan polycarboxylic acids, lower mercaptan monohydric alcohols and lower mercaptan polyhydric alcohols to form a compound of the formula

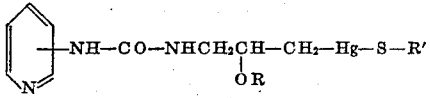

wherein in occurrence R is a member of the group consisting of hydrogen and lower alkyl groups, A is a member of the group consisting of halo, hydroxy and lower acyloxy groups, and R' is a member of the group consisting of monocarboxy substituted lower alkyl groups, polycarboxy substituted lower alkyl groups, monocarboxy substituted phenyl groups, polycarboxy substituted phenyl groups, lower monohydric alcohol groups and lower polyhydric alcohol groups.

References Cited in the file of this patent

UNITED STATES PATENTS 2,635,982    Rowland _____ Apr. 21, 1953